(12) United States Patent
Regazzi et al.

(10) Patent No.: US 6,943,476 B2
(45) Date of Patent: Sep. 13, 2005

(54) MAGNETO GENERATOR FOR SELF-POWERED APPARATUSES

(75) Inventors: Gianni Regazzi, Argelato (IT); Manuel Cocchi, San Giovanni In Persiceto (IT)

(73) Assignee: Ducati Energia S.p.A., Bologna (IT)

( * ) Notice: Subject to any disclaimer, the term of this patent is extended or adjusted under 35 U.S.C. 154(b) by 0 days.

(21) Appl. No.: 10/866,243

(22) Filed: Jun. 14, 2004

(65) Prior Publication Data

US 2004/0251762 A1 Dec. 16, 2004

(30) Foreign Application Priority Data

Jun. 13, 2003 (IT) ...................................... MI2003A1198

(51) Int. Cl.⁷ .............................................. H02K 21/12
(52) U.S. Cl. .................. 310/156.47; 310/152; 310/153; 310/74
(58) Field of Search ....................... 310/156.43–156.49, 310/74, 152–153, 70 A, 70 R

(56) References Cited

U.S. PATENT DOCUMENTS

| 2,528,700 A | * | 11/1950 | McGrevy .................... 310/153 |
| 3,821,570 A | | 6/1974 | Burson |
| 3,911,889 A | | 10/1975 | Nagasawa |
| 4,636,671 A | | 1/1987 | Terada |
| 5,635,801 A | | 6/1997 | Regazzi et al. |
| 5,838,085 A | | 11/1998 | Roesel, Jr. |
| 6,111,390 A | * | 8/2000 | Inaba et al. ................... 322/28 |
| 6,278,194 B1 | * | 8/2001 | Nakagawa et al. ........... 290/31 |
| 2003/0034712 A1 | | 2/2003 | Rose |

FOREIGN PATENT DOCUMENTS

| JP | 11069679 | 3/1999 |
| JP | 2001 016806 | 1/2001 |
| JP | 2001 078413 | 3/2001 |
| WO | WO 96/28874 | 9/1996 |

* cited by examiner

Primary Examiner—Thanh Lam
(74) Attorney, Agent, or Firm—Young & Thompson

(57) ABSTRACT

A magneto generator for self-powered apparatuses; the magneto generator comprises a stator provided with an electric winding, and a permanent magnet rotor coaxially arranged to the stator. The stator and the rotor have a first, and respectively a second pole system which together with the electric winding define a multiphase electromagnetic system connected to a bridge rectifier, secured to the stator. The poles of the stator and the poles of the rotor have opposite polar surfaces in which the axis of each polar surface of the rotor, is slanted with respect to a reference line parallel to the longitudinal axes of the polar surfaces of the stator.

8 Claims, 3 Drawing Sheets

MAGNETO GENERATOR FOR SELF-POWERED APPARATUSES

BACKGROUND OF THE INVENTION

This invention refers to permanent magnet electric generators, hereinafter magneto generators, and in particular to magneto generators designed for use in self-powered apparatuses.

STATE OF THE ART

As is known, magneto generators are frequently used in combination with internal combustion engines, as current generators for powering the electric loads on board a vehicle, and for charging its battery. The usual application fields of these magneto generators are in general two-wheeled vehicles, snowmobiles, small three or four-wheeled vehicles, and similar applications.

Examples of magneto generators are found in U.S. Pat. Nos. 3,821,570, 3,911,889, 4,636,671 and 5,635,801.

In general, a magneto generator comprises: a stator having a magnetic circuit and an electric winding defining a first pole system; a permanent magnet rotor supported to rotate coaxially with the stator, in which the rotor in turn has a magnetic circuit defining a second pole system magnetically linked to the pole system of the stator. The two pole systems have opposite polar surfaces, which extend parallel to the longitudinal axis of the rotor.

For magneto generators used in the aforementioned applications, in addition to efficiency, it is important to provide mechanical sturdiness and ability to work at high temperatures.

A further application field of magneto generators is the self-powered apparatuses; for example, the professional apparatuses normally used in gymnasiums, medical centers or by private users for performing physical exercises, such as cyclettes and the like. For these apparatuses it is necessary have an independent power supply available to operate an electromagnetic brake which establishes the level of physical effort, and supply power to a computer which processes and displays all the data pertaining to the physical effort, such as for example the calories burned, the heart rate and other data or information.

In this particular field, taking the power from an ordinary electric network to supply all the facilities of the apparatus, involves the use of connecting cables which may prove inconvenient when moving the apparatus about in the environment, involving in addition safety problems and the consequent need to adopt suitable measures to prevent any injury to the user.

For these reasons, there are self-powered apparatuses on sale, which make use of a magneto generator that exploits the energy of the person performing the physical exercise, to generate the current necessary to supply the various facilities.

In particular, the magneto generator can be used to produce the electric power necessary to supply the various parts of the apparatus, including the electromagnetic brake, or can carry out both the functions of supplying power to the apparatus and of electromagnetic brake.

THE TECHNICAL PROBLEM

The use and the noisiness of magneto generators in general do not entail particular problems in the great majority of the application fields; however, in the field of self-powered apparatuses, of the kind previously mentioned, the noise and the vibrations caused by the generator constitute a serious and troublesome problem.

A further problem consists of the "hunting" phenomenon of the generator, caused by the fact that the salient poles of the stator, with which the generator is normally provided, does not have constant magnetic resistance along the entire periphery of the magnetic air gap existing between the rotor and the same stator; with the result that, when the generator is stopped, it causes the rotor to hunt around any position having a minimum magnetic resistance.

In some apparatus, for example in cyclettes, this hunting proves to be bothersome in that it is reflected onto the pedals, and can be negatively felt by the user carrying out the exercise.

The salient poles of the stator and the lack of a constant magnetic resistance, in addition to generating the hunting phenomenon, also give rise to vibrations which, in addition to being a further cause of noise, also prove to be annoying in that, by means of the metal frame of the apparatus, they are transmitted to the user.

Further causes of noise are the vibrations generated by the electrodynamic reactions of the electric currents flowing in the winding of the generator.

OBJECTS OF THE INVENTION

The main object of this invention is to provide a magneto generator for use in self-powered apparatuses, which presents a low degree of hunting and limited noise.

A further object of this invention is to provide a magneto generator, for the aforementioned use, in which the electrodynamic reactions generated by the currents flowing in the generator are substantially reduced to a minimum, thereby further reducing the noise.

A still further object is to provide a magneto generator which has a magnetic resistance to rotation of a substantially constant value, and in which the ripple of the rectified output current from the generator is reduced to an extremely low level, for example equivalent to or lower than 1%, with a consequent further reduction of vibrations and noise of the generator.

BRIEF DESCRIPTION OF THE INVENTION

According to the invention a magneto generator has been provided for self-powered apparatuses, comprising:

a stator having a first magnetic circuit and an electric winding defining a first pole system;

a rotor coaxially arranged to the stator, the rotor in turn having a second magnetic circuit comprising a second pole system, said first and second pole systems of the magneto generator defining a multiphase electromagnetic system;

the poles of the stator and of the rotor having opposite polar surfaces each extending on a respective longitudinal axis; and in which the electric winding of the stator is connected to a rectifier bridge for the electric current flowing from the generator, characterised in that the longitudinal axis of each polar surface of the rotor is angularly slanted in a same direction, with respect to a reference line parallel to the longitudinal axes of the polar surfaces of the stator.

The angle formed by the longitudinal axis of the polar surface of each pole of the rotor, with respect to a reference line parallel to the longitudinal axis of each polar surface of the stator, which in the example shown is in turn parallel to the rotational axis of the rotor, can be chosen from among a wide range of values between 10° and 30°; preferably, for rotors having a length ranging from 15 to 25 centimeters, the slant of the longitudinal axis of the polar surface of each pole of the rotor, can range from 15° to 20°. In fact, from tests carried out, it was noted that in this narrow range of values, the hunting phenomenon as well as the noise of the generator are reduced to a greater degree.

According to a still further feature of the invention, in order to reduce the phenomena related to the vibrations caused by the electromagnetic reactions of the currents flowing in the stator winding, it was found to be advantageous to use a six-phase system for the electric winding and the current rectifier; the latter has been advantageously secured directly onto a side of the stator. In this way, it is possible to considerably simplify the connection of the rectifier bridge to the electric winding of the generator and to an external circuit.

BRIEF DESCRIPTION OF THE DRAWINGS

This and further features of the magneto generator for self-powered apparatuses, according to this invention, will be more clearly evident from the following description with reference to the example of the accompanying drawings in which reference is made to a six-phase generator, with a 16-pole rotor and a 24-pole stator; in the drawings.

DETAILED DESCRIPTION OF THE INVENTION

Figure 1:
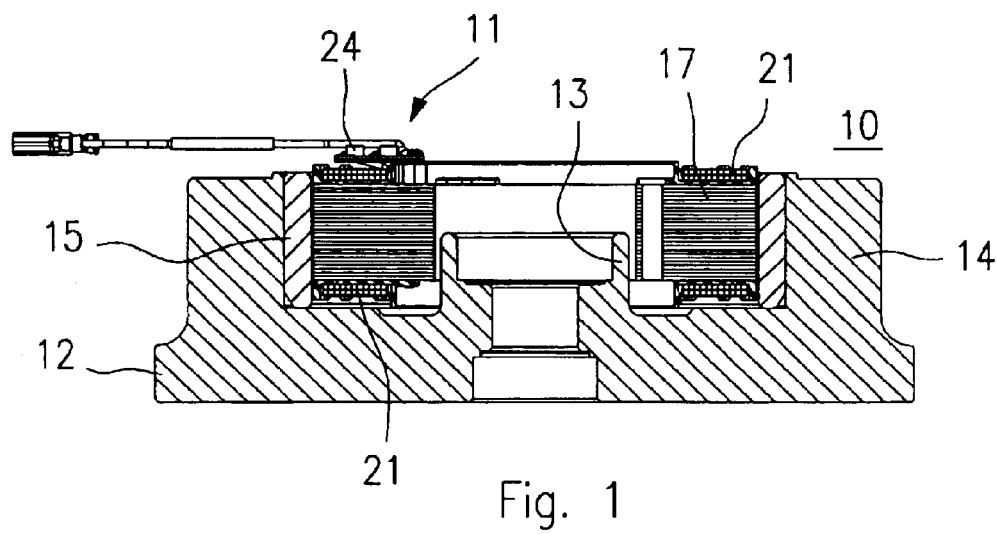
FIG. 1 shows a longitudinal cross-sectional view of the generator.
Figure 3:
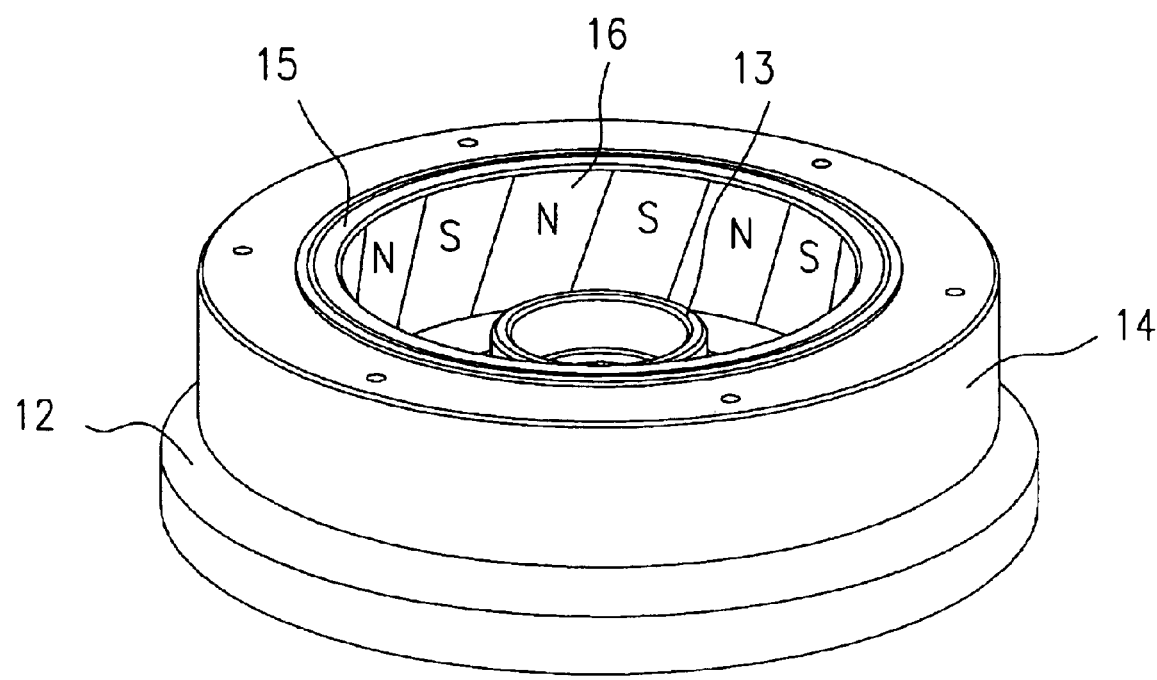
FIG. 3 shows a perspective view of the rotor.
Figure 5:
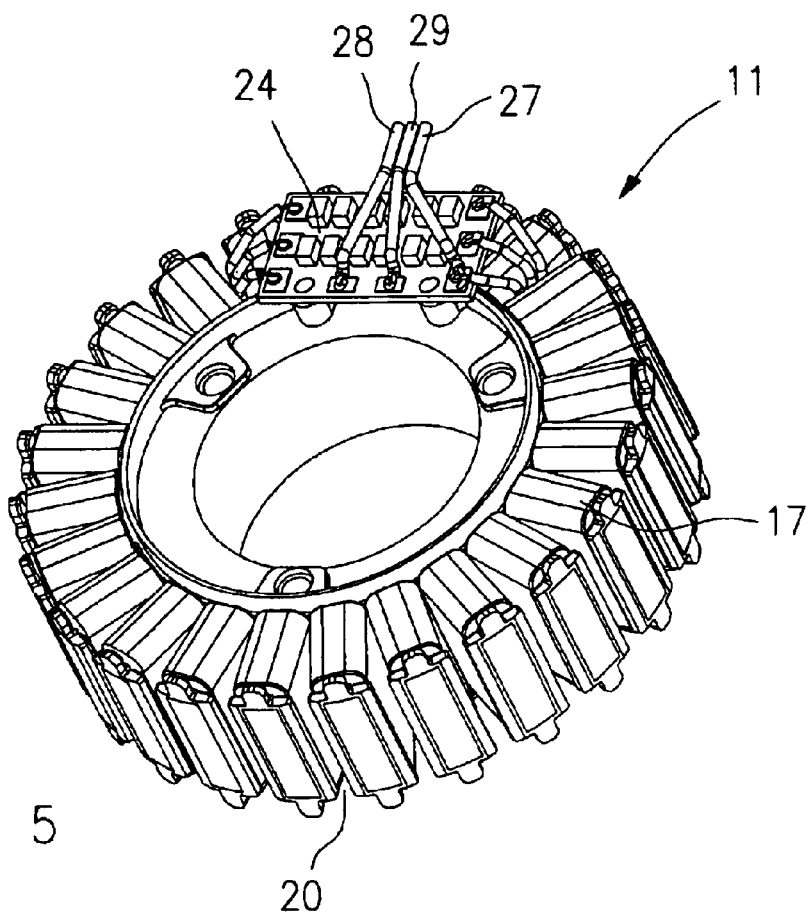
FIG. 5 shows a perspective view of the stator.

As shown in FIG. 1, the magneto generator 10 comprises a stator 11 more clearly illustrated in the perspective view of FIG. 5, and a rotor 12 more clearly illustrated in the perspective view of FIG. 3.

The rotor 12 comprises a bottom wall provided with a hub 13 for fastening the rotor 12 to a drive shaft connected directly or indirectly, for example to the pedals of a cyclette. The rotor 12 also comprises a peripheral wall 14 onto the inside of which a ring 15 of magnetic material is secured; the bottom and the peripheral walls of the rotor have a considerable thickness so as to constitute a sort of flywheel.

The magnetic ring 15 of the rotor is magnetised radially to form a first magnetic pole system having alternately opposite N and S polarities, which are disposed in succession around the entire circumference on the inner surface of the ring member 15.

The use of a single magnetic ring 15 for the rotor proves to be extremely advantageous, compared to the use of individual magnets, in that it makes it possible to obtain a more evenly balanced symmetrical structure, thereby preventing hunting and vibrations.

Figure 4:
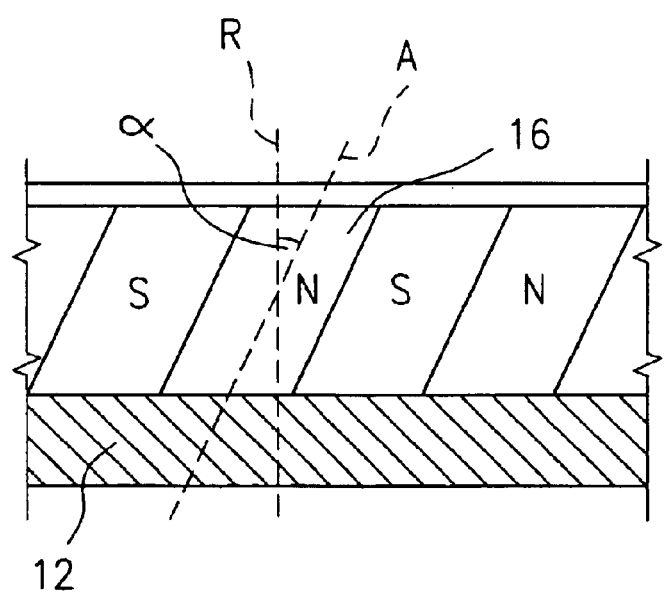
FIG. 4 shows a detail of the rotor.

As shown more clearly in FIG. 3, and in the enlarged detail of FIG. 4, each pole of the rotor 12, on the inner side facing the stator 11, has a polar surface 16 which extends along the entire height of the peripheral wall 14, in the direction of the longitudinal axis of rotation of the rotor 12.

The detail in FIG. 4 shows with greater clarity one of the characteristics of the magneto generator according to this invention; from this figure it can be seen that the N, S poles of the rotor 12, designed to face the poles 17 of the stator 11, have a slanted disposition of their sides compared to an usual disposition parallel to the axis of the rotor of the conventionally known magneto generators.

More precisely, as shown in FIG. 4, each N, S pole face of the rotor has a polar surface 16 having a longitudinal axis A which extends parallel to the lateral edges defined by the ideal separation planes between the adjacent magnetic poles of the ring 15.

In particular, the longitudinal axis A of each pole forms an angle $\alpha$ with a straight reference line R parallel to the generating line of the cylindrical surface of the magnetic ring 15, or parallel to the rotational axis of the rotor 12.

The slanting angle $\alpha$ of the poles N and S of the rotor must be determined by appropriate experimental tests, also taking into consideration the axial length of the rotor. In general, the angle $\alpha$ can be chosen within range from 10° to 30°, for rotors having a length ranging from 15 to 25 millimetres; the angle $\alpha$ can preferably range from 15° to 20° in that it has been found that within this interval of values the best performances are achieved in terms of reduction of the hunting phenomenon of the rotor and noise of the generator, without however excluding acceptable performances also for values lower or higher than the range of values indicated above.

The use of a magnetic circuit for the rotor, consisting of a single magnetic ring member, was chosen for the purpose of eliminating any dimensional difference between the poles; in fact, by constructing the rotor in a conventional way, that is to say, by using individual magnets fastened to a ferromagnetic supporting ring, it would be absolutely impossible to guarantee a perfect mechanical and magnetic symmetry and balanced conditions, due to the inevitable differences existing between the various magnets, with the consequent inconveniences that a conformation of this kind would involve vibrations and noise.

The magnetic ring 15 is consequently magnetised radially with the poles appropriately slanted in order to make the magnetic resistance between rotor and stator constant along the entire air gap.

The difference in behavior between an usual rotor having non-slanting poles and a rotor with slanting poles according to the invention, can be verified immediately also by hand, by moving the rotor and noting the lack of clicks in the rotational movement, as well as the lack of dead points or preferential stopping positions.

Figure 2:
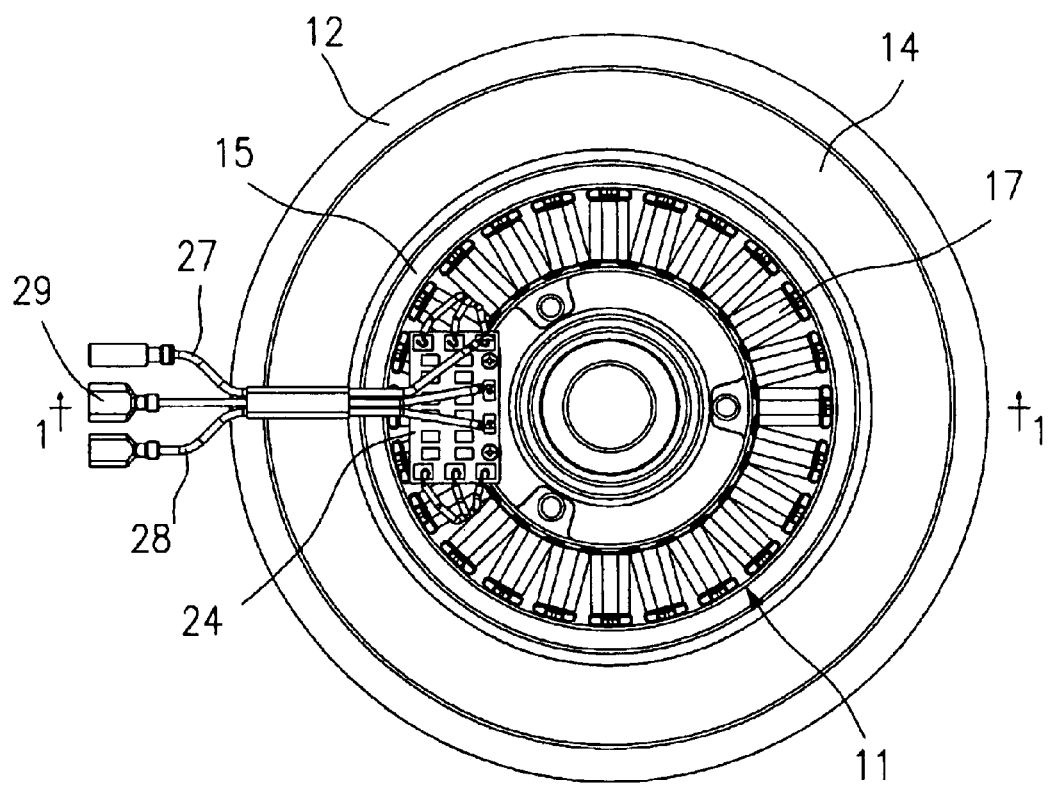
FIG. 2 shows a top view of FIG. 1.

The stator 11, as shown in FIGS. 1, 2 and 5, in turn comprises a magnetic circuit defining a second pole system of radially disposed salient poles 17. Each pole 17 of the stator 11 is obtained by blanking from magnetic sheet metal; the appropriately-shaped laminations are packed and subsequently co-molded with insulating plastic material, onto which the individual coils of the winding will subsequently be wound. Each pole 17 of the stator 11 has a peripheral polar surface facing towards the rotor, having a longitudinal axis parallel to the axis of the polar surface of the rotor, that is to say, parallel to a reference lines R for the polar surfaces 16 of the rotor 12.

In a per se known way, each pole 17 of the stator 11 is surrounded by a coil 21 electrically connected to the coils 21 of the other poles 17 to form the electric winding in which electric current output by the generator will be induced to flow, for powering an apparatus to which the generator is connected.

Figure 6:
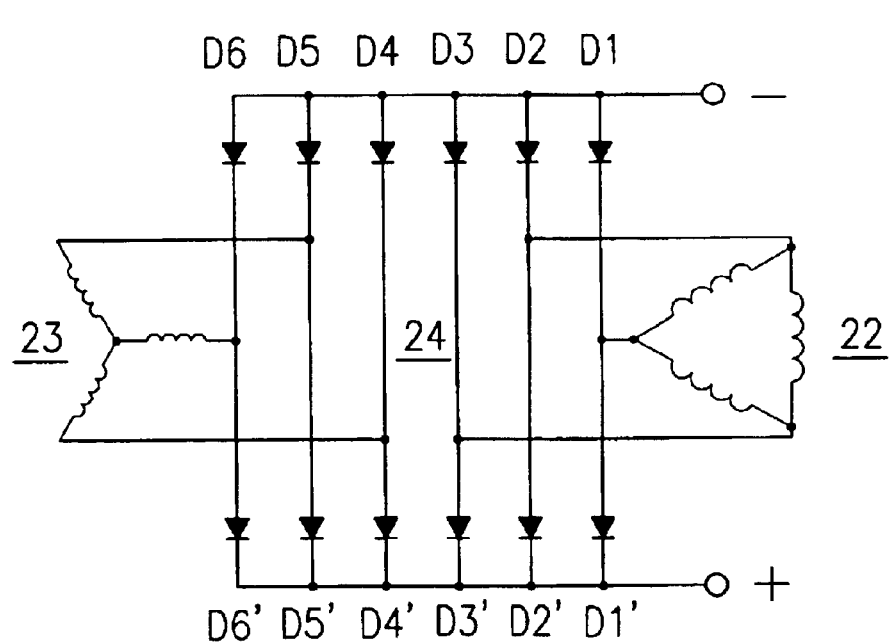
FIG. 6 shows a diagram of the electric winding of the stator, with a six-phase rectifier bridge.

In particular, in the case of a six-phase generator, as shown in the example of FIG. 6, the electric winding of the stator comprises a first delta winding 22 connected to a set of diodes D1, D2, D3 and D'1, D'2, D'3 of a rectifier bridge 24; also comprises a second star winding 23 connected to a second set of diodes D4, D5, D6 and D'4, D'5, D'6 of the rectifier bridge 24.

In this way, the rectified pulse current, from the bridge of diodes 24, can be fed to the apparatus by means of the conductors 27 and 28, and presents a very low ripple factor, equivalent to or lower than 1%.

Preferably, according to a further feature of the magneto generator in conformity with this invention, the rectifier bridge 24 is secured directly to a side of the stator 11; this particular disposition of the bridge of diodes 24 enables it to be connected directly to the windings 22 and 23, with the advantage of having two conductors 27 and 28 only at the outlet of the generator, in addition to the earth conductor 29.

Even though a three-phase solution with a star or delta connection of the stator winding proves to be the most economical of all the possible multiphase solutions, it was found to be advantageous to choose a six-phase solution in that it proves to be the most technically interesting one, because it offers the possibility of reducing the current ripple to a very low level; to achieve this result, it is necessary to make the two electric windings 22 and 23 out of phase with each other, one of which delta-connected and the other star-connected, thus obtaining, at the outlet of the rectifier bridge 25, pulses of current shifted 30° out of phase and, consequently, very low ripple values.

From what has been described and shown in the example of the FIGS. from 1 to 6, it will be clear that what is provided is a magneto generator, having the described characteristics; however, it is obvious that other modifications or variations may be made in relation to the angular disposition of the polar surfaces of the stator and of the rotor, to the electric winding of the stator and to the two polar systems, without thereby deviating from the scopes of the claims.

We claim:

1. A magneto generator for self-powered apparatuses, comprising:
   - a stator having a first magnetic circuit and an electric winding defining a first pole system;
   - a rotor coaxially arranged to the stator, the rotor in turn having a second magnetic circuit comprising a second pole system said first and second pole systems defining a multiphase electromagnetic system;
   - the poles of the stator and of the poles of the rotor having opposite polar surfaces each extending on a respective longitudinal axis; and
   - in which the electric winding of the stator is connected to a diode bridge for rectifying the electric current flowing from the generator, characterised in that
   - the longitudinal axis of each polar surface of the rotor pole system is angularly slanted in a same direction, with respect to a reference line parallel to the longitudinal axes of the polar surfaces of the stator.

2. A magneto generator according to claim 1, characterised in that the angle between the axis of each polar surface of the poles of the rotor and the reference line ranges from 10° to 30°.

3. A magneto generator according to claim 2, characterised in that the aforesaid angle ranges preferably from 15° to 20°.

4. A magneto generator according to claim 1, characterised in that the longitudinal axis of the polar surface of each pole of the rotor, is slanted with respect to the rotational axis of the rotor.

5. A magneto generator according to claim 1, characterised in that the magnetic circuit of the rotor is consisting of a single radially polarised ring member.

6. A magneto generator according to claim 1, characterised in that the rectifier bridge is directly secured to a side of the stator.

7. A magneto generator according to claim 1, characterised in that the polar system of the rotor, the polar system of the stator, and the electric winding define a six-phase electromagnetic system.

8. A magneto generator according to claim 7, characterised in that said six-phase electromagnetic system comprises a first delta winding connected between a first set of diodes of the rectifier bridge, and a second star winding connected between a second set of diodes of the rectifier bridge.

* * * * *